A. C. YERKEY.
BLOW-OFF VALVE.
APPLICATION FILED JAN. 29, 1913.
1,067,959.
Patented July 22, 1913.
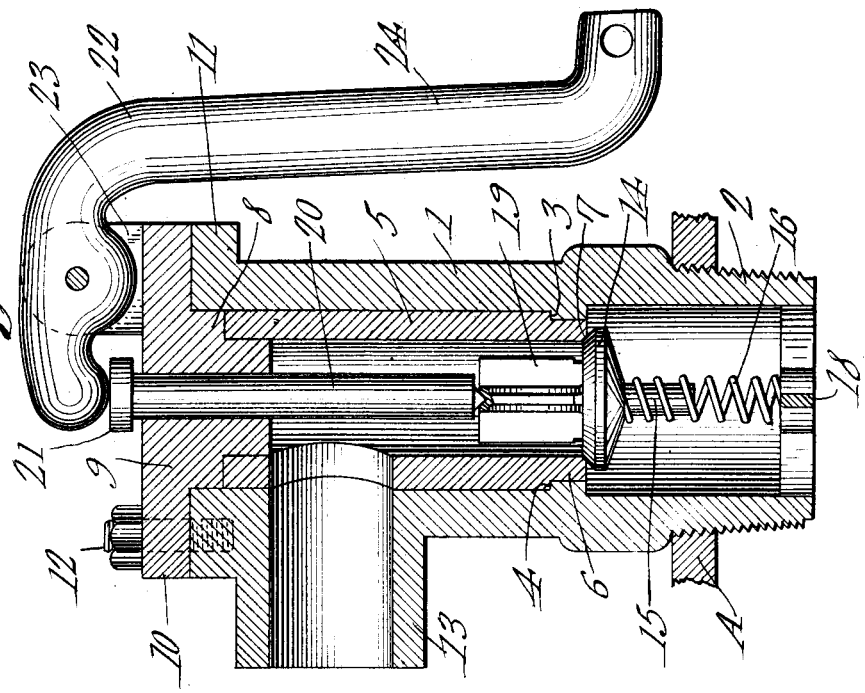
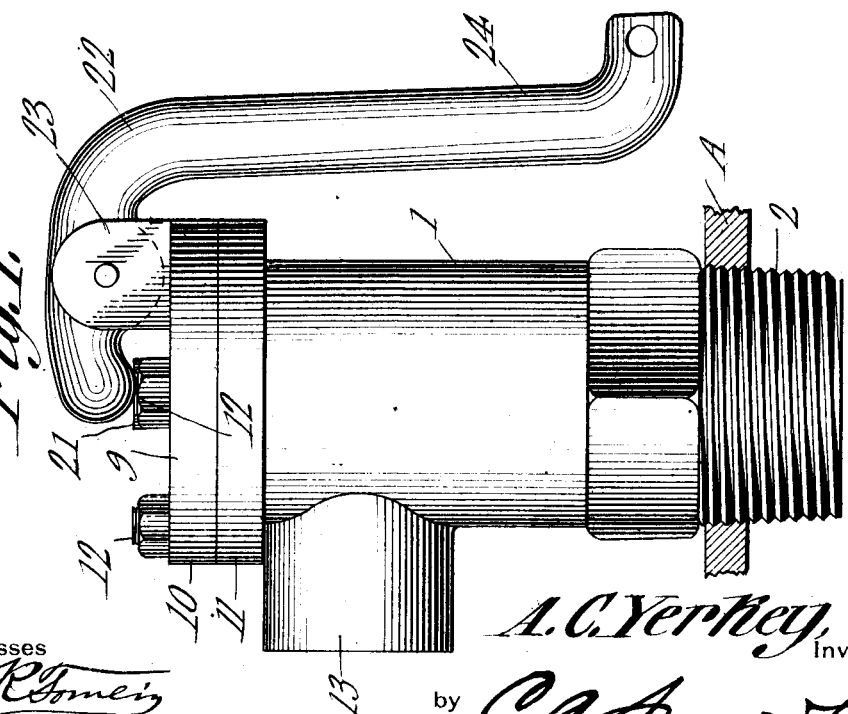

UNITED STATES PATENT OFFICE.

ALVY CLEVELAND YERKEY, OF CHICAGO, ILLINOIS.

BLOW-OFF VALVE.

1,067,959. Specification of Letters Patent. Patented July 22, 1913.

Application filed January 29, 1913. Serial No. 744,986.

*To all whom it may concern:*

Be it known that I, ALVY C. YERKEY, a citizen of the United States, residing at Chicago, in the county of Cook and State of Illinois, have invented a new and useful Blow-Off Valve, of which the following is a specification.

This invention relates to blow-off valves, its object being to provide a device of this character formed of but few parts and which can be used both for filling and for drawing off water from the boiler to which the device is connected.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation. Fig. 2 is a vertical section.

Referring to the drawings by characters of reference 1 designates the casing of the valve, the same being formed of brass, iron or any other suitable material and provided with a threaded end 2 adapted to be screwed into the boiler A. The casing 1 is formed with an interior shoulder 3 constituting the seat for an annular shoulder 4 formed upon the bushing 5. This bushing is preferably formed of steel and has its reduced end portion 6 extending downwardly past the shoulder 3 and tapered interiorly to form a seat, as shown at 7. The outer end of the casing 1 is designed to receive a head 9, this head being formed with an extension 8 adapted to fit in the bushing and with a flange 10 which can be secured to an annular flange 11 on the casing 1, by threaded studs 12. A nipple 13 extends from the casing 1 and registers with an opening in the bushing. A valve 14 is normally held against the seat 7, this valve having a stem 15 projecting therefrom and into a coiled spring 16, said coiled spring being mounted on a spider 18 which is arranged within the reduced end portion 2 of the casing 1. Valve 14 has a spider 19 extending therefrom and into the bushing 5 and slidably mounted in the head 9 and above the center of the spider 19 is a pin 20, the upper or outer end of which has a head 21. A lever 22 is fulcrumed on an ear 23 located on the head 9 and one end of this lever is adapted to contact with the head 21 while the other end portion extends downwardly, as shown at 24 so as to constitute a handle whereby the lever can be actuated readily.

As hereinbefore stated, the valve 14 is held normally upon its seat by the spring 16. When the valve is thus positioned, water cannot escape through the casing 1 by way of bushing 5 and nipple 13. However, by shifting lever 22 so as to cause it to press downwardly on head 21, pin 20 will push the valve 14 off of its seat and water will thus be free to escape into bushing 5 and thence outwardly through the nipple 13. Also, by holding valve 14 off of its seat, water can be supplied to the boiler by directing it into the nipple 13 so that it can thus flow into the bushing 5 and thence downwardly into the casing 1.

It will be seen that the entire device is formed of but few parts and will not, therefore, readily get out of order.

Instead of threading one end of the casing, a threaded extension may be formed on the casing for engaging the boiler.

What is claimed is:—

1. In a blow-off valve the combination with a casing having an interior shoulder, of a bushing having an annular shoulder adapted to bear upon said interior shoulder and provided with an interiorly tapered portion constituting a seat, a head secured upon one end of the casing and bearing against and within the bushing to hold it upon the interior shoulder, a nipple extending from the casing and opening into the bushing, a spring pressed valve normally held upon the seat in the inner end of the bushing, a shifting pin within the head contacting with the valve, and means for actuating the pin to unseat the valve.

2. A blow-off valve including a casing having an interior shoulder, a bushing fitted snugly within the casing and bearing upon the shoulder, said bushing having a valve seat in its inner end, a head secured upon one end of the casing and bearing against and within the bushing to hold it upon the interior shoulder, a nipple extending from the casing and opening into the bushing, a spring pressed valve normally bearing against the seat, a pin slidable within the head and bearing against the valve, and a lever fulcrumed on the head and shiftable against the pin to unseat the valve.

In testimony that I claim the foregoing as my own, I have hereto affixed my signature in the presence of two witnesses.

ALVY CLEVELAND YERKEY.

Witnesses:
CHAS. B. SORENSON,
D. M. YERKEY.